United States Patent
Kang et al.

(10) Patent No.: US 10,176,221 B2
(45) Date of Patent: Jan. 8, 2019

(54) DATA PROCESSING APPARATUS AND PREDICTION METHOD OF PATTERN FREQUENCY THEREOF

(71) Applicant: Bitnine Co., LTD., Seoul (KR)

(72) Inventors: Cheol Sun Kang, Seoul (KR); Kisung Kim, Seongnam (KR)

(73) Assignee: Bitnine Co., LTD., Seoul (KR)

( * ) Notice: Subject to any disclaimer, the term of this patent is extended or adjusted under 35 U.S.C. 154(b) by 648 days.

(21) Appl. No.: 14/868,394

(22) Filed: Sep. 29, 2015

(65) Prior Publication Data
US 2016/0092509 A1 Mar. 31, 2016

(30) Foreign Application Priority Data

Sep. 30, 2014 (KR) .................. 10-2014-0131661

(51) Int. Cl.
*G06F 17/30* (2006.01)
(52) U.S. Cl.
CPC .. *G06F 17/30457* (2013.01); *G06F 17/30958* (2013.01)
(58) Field of Classification Search
CPC ............... G06F 17/30457; G06F 17/30958
See application file for complete search history.

(56) References Cited

U.S. PATENT DOCUMENTS

2011/0173189 A1* 7/2011 Singh ............... G06F 17/30958
707/722
2014/0244687 A1* 8/2014 Shmueli ............ G06F 17/30587
707/780
2014/0365531 A1* 12/2014 Soundararajan .. G06F 17/30587
707/798

(Continued)

FOREIGN PATENT DOCUMENTS

JP 2001-134575 A 5/2001
JP 2010-277438 A 12/2010
(Continued)

OTHER PUBLICATIONS

Article entitled "Performance of Graph Query Languages" by Holzschucher et al., dated Mar. 22, 2013.*

(Continued)

*Primary Examiner* — Mahesh H Dwivedi
(74) *Attorney, Agent, or Firm* — Patent Office of Dr. Chung Park

(57) ABSTRACT

Provided are data processing apparatus and methods for predicting a pattern frequency thereof. The data processing apparatus includes: a storage unit adapted to store a preset graph pattern, an occurrence frequency of the preset graph pattern, and information on actual data nodes corresponding to each node which belongs to the graph pattern; and a control unit adapted to compare the preset graph pattern with a graph pattern to be searched to perform a graph search, and when the preset graph pattern is not included in the graph to be searched, search for a node shared by two different preset graph patterns which are stored in the storage unit to perform the graph search. By this configuration, it is possible to predict a level of an intermediate result to optimize a graph query and effectively calculate sizes of various graphs patterns while making a capacity of a memory small.

5 Claims, 3 Drawing Sheets

(56) References Cited

U.S. PATENT DOCUMENTS

2016/0048607 A1* 2/2016 Raman .............. G06F 17/30958
707/798
2017/0212931 A1* 7/2017 Chen ................. G06F 17/30466

FOREIGN PATENT DOCUMENTS

| JP | 2013-003669 A | 1/2013 |
| JP | 2013-145508 | 7/2013 |

OTHER PUBLICATIONS

Article entitled "AgensGraph: A Multi-model Graph Database", by Kim, dated 2017.*

* cited by examiner

DATA PROCESSING APPARATUS AND PREDICTION METHOD OF PATTERN FREQUENCY THEREOF

CROSS-REFERENCE TO PRIOR APPLICATIONS

This application claims priority of Korean Patent Application No. 10-2014-0131661, filed on Sep. 30, 2014, which is hereby incorporated by reference in its entirety.

TECHNICAL FIELD

The present invention relates to a data processing apparatus and a method for predicting a pattern frequency thereof. More particularly, the present invention relates to a data processing apparatus capable of predicting a frequency of a query pattern used in a graph database, and a method for predicting a pattern frequency thereof.

BACKGROUND ART

A data processing apparatus is adapted to store and process input data, and output a result corresponding to a query input by a user. In particular, when a capacity of the input data is large, various types of databases are used to increase a processing rate and obtain reliable results.

Among these databases, a graph database may be optimized to process semi-structured data which does not observe a structured data model rule connected to a relational database or a different type of data table, such that it may be applied to various fields such as social data, recommendation, and geographic spatial analysis.

Meanwhile, a query of the graph database may be represented as a graph pattern, and a query for searching for a specific pattern in the overall graph is performed to search for the desired data.

FIG. 1 is a diagram illustrating a query used in a conventional graph database as the graph pattern. A process of processing the query is performed by searching for the whole graph to search for a sub graph matching with the input query pattern. In this case, which portion of the graph pattern query is first searched has a great effect on query processing performance. Therefore, it is important to accurately predict a level of an intermediate result at the time of searching for a graph.

Even the conventional relational database uses a method of predicting an intermediate result by making a histogram for a table to make a query processing execution plan at the time of processing the query.

However, the graph database does not have a fixed schema and has a structure in which a data form is more complicated than that of the relational database, such that there is a problem that the histogram for the relational database may not be applied to the graph database.

DISCLOSURE

Technical Problem

Accordingly, it is an object of the present invention to provide a data processing apparatus capable of predicting a level of an intermediate result to optimize a graph query, and a method for predicting a pattern frequency thereof.

Another object of the present invention is to provide a data processing apparatus capable of effectively calculating sizes of various graph patterns while making a capacity of a memory small, and a method for predicting a pattern frequency thereof.

Technical Solution

The above-described objects are achieved by a data processing apparatus, including: a storage unit adapted to store a preset graph pattern, an occurrence frequency of the preset graph pattern, and information on actual data nodes corresponding to each node which belongs to the graph pattern; and a control unit adapted to compare the preset graph pattern with a graph pattern to be searched to perform a graph search, and when the preset graph pattern is not included in the graph to be searched, search for a node shared by two different preset graph patterns which are stored in the storage unit to perform the graph search.

The graph pattern may have size of a preset value or less.

Information on the actual data node or a node shared by the graph pattern may be stored by a list or a hash structure.

The occurrence frequency of the graph pattern to be searched may be calculated by multiplying the occurrence frequencies of each of the two preset graph patterns The above-described objects are also achieved by a method for predicting a pattern frequency of a data processing apparatus, including: storing, by a control unit, a preset graph pattern, an occurrence frequency of the preset graph pattern, and information on actual data nodes corresponding to each node which belongs to the graph pattern; searching, by the control unit, when the preset graph pattern is not included in a graph to be searched, a node shared by two different preset graph patterns which are stored in a storage unit; and calculating, by the control unit, a pattern distribution of a graph pattern to be searched including two preset patterns which share one node by multiplying values of pattern distributions corresponding to the two preset patterns.

Advantageous Effects

In accordance with the data processing apparatus and the method for predicting a pattern frequency thereof according to the present invention, it is possible to predict the level of the intermediate result to optimize the graph query.

Further, in accordance with the data processing apparatus and the method for predicting a pattern frequency thereof according to the present invention, it is possible to effectively calculate the sizes of various graph patterns while making the capacity of the memory small.

BEST MODE

Hereinafter, a data processing apparatus and a method of a pattern frequency thereof according to the present invention will be described in detail with reference to the accompanying drawings.

Figure 1:
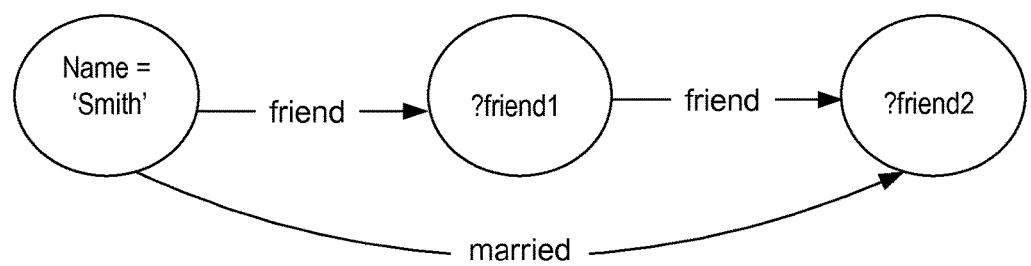
FIG. 1 is a diagram illustrating a query used in a conventional graph database as a graph pattern.
Figure 2:
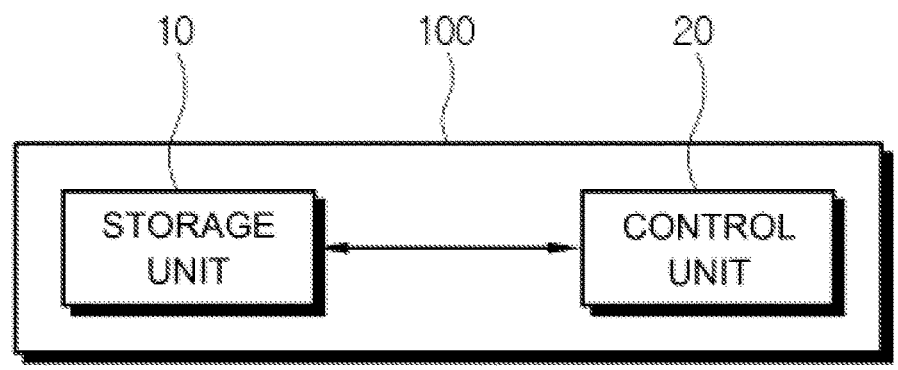
FIG. 2 is a block diagram illustrating a configuration of a data processing apparatus according to the present invention.

FIG. 2 is a block diagram illustrating a configuration of a data processing apparatus according to the present invention. As illustrated in FIG. 2, a data processing apparatus 100 according to the present invention includes a storage unit 10 and a control unit 20.

The storage unit 10 is adapted to store a preset graph pattern, an occurrence frequency of the preset graph pattern, and information on actual data nodes corresponding to each node which belongs to the graph pattern. In this case, the number of cases for calculating a pattern distribution is exponentially increased in response to a size of a graph pattern, the size of the preset graph pattern is preferably limited to a specific value or less.

The control unit 20 is adapted to compare the preset graph pattern with a graph pattern to be searched to perform a graph search, and when the graph pattern to be searched is not included in the preset graph pattern stored in the storage unit 10, search for a node shared by two different preset graph patterns which are stored in the storage unit 10 to perform the graph search.

In detail, first, if it is determined that the graph pattern to be searched matches with the preset graph pattern stored in the storage unit 10, the control unit 20 according to the present invention determines that the pattern distribution corresponding to the preset graph pattern is the pattern distribution of the graph pattern to be searched.

Further, if it is determined that the graph pattern to be searched is not included in the preset graph pattern stored in the storage unit 10, the control unit searches for the node shared by the two different preset graph patterns which are stored in the storage unit 10 to perform the graph search. In this case, it is assumed that the node shared by two different preset graph patterns is one, and the data nodes generated for the nodes of each pattern have an equal distribution.

Therefore, the control unit 20 may calculate the pattern distribution of the graph pattern to be searched including two preset patterns which share one node by multiplying values of the pattern distributions corresponding to the two preset patterns.

Figure 3:
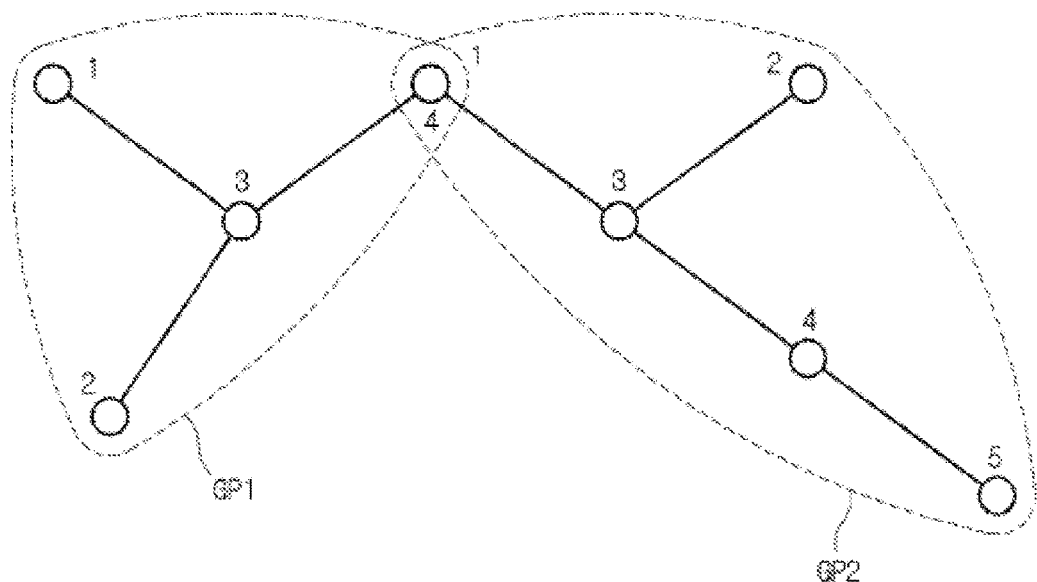
FIGS. 3 and 4 are diagrams for describing a process of performing a graph search by the data processing apparatus according to the present invention.

FIG. 3 is a diagram for describing a process of performing the graph search by the data processing apparatus according to the present invention. As illustrated in FIG. 3, when different graph patterns GP1 and GP2 stored in the storage unit 10 share one node, the occurrence frequency of a graph pattern GP3 to be searched including the two graph patterns GP1 and GP2 is calculated by the following Equation 1.

$$C(GP3) = \frac{C(GP1)}{|V1|} \times \frac{C(GP2)}{|V2|} \times |V1 \cap V2| \quad \text{[Equation 1]}$$

Herein, each of V1 and V2 denotes a set of the data nodes matched with the nodes shared by the two graph patterns, and when V1∩V2 maintains a list of the data nodes for each node, the pattern distribution may be predicted by directly obtaining an intersection or an algorithm such as a hash.

Figure 4:
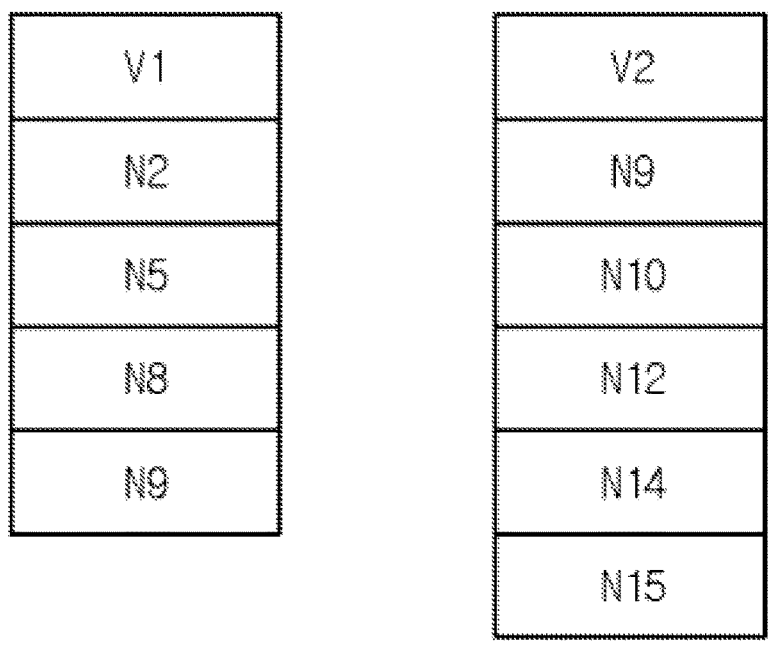

FIG. 4 is a diagram illustrating a structure of a data node list stored by the data processing apparatus 100 according to the present invention. As illustrated in FIG. 4, the pattern distribution is predicted by multiplying the pattern distributions of the matched nodes in the data node list corresponding to the node shared with another preset pattern in one preset pattern stored in the storage unit 10. That is, since the two graph patterns share a node N9, the pattern distribution of the graph pattern to be searched may be predicted by multiplying the pattern distributions of GP1 and GP2 corresponding to the V1 and V2, respectively. In this case, the information on the actual data node or the node shared by the graph pattern is preferably stored by the list or a hash structure.

Figure 5:
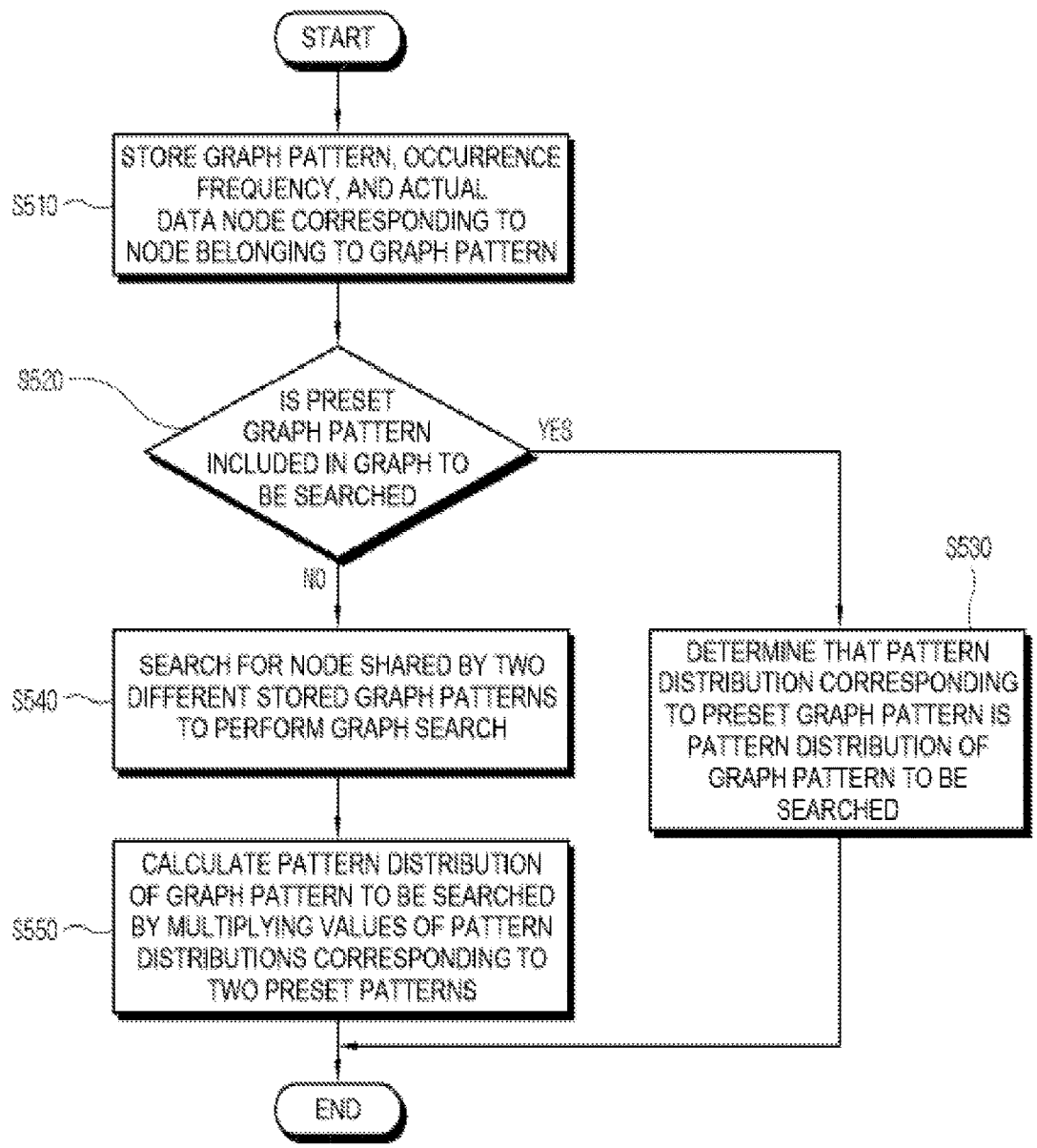
FIG. 5 is a flow chart for describing a method for predicting a pattern frequency of a data processing apparatus according to the present invention.

FIG. 5 is a flow chart illustrating a method for predicting a pattern distribution of the data processing apparatus 100 according to the present invention.

First, the control unit 20 stores the preset graph pattern, the occurrence frequency of the preset graph pattern, and the information on the actual data nodes corresponding to each node which belongs to the graph patterns (S510).

Next, the control unit 20 determines whether the preset graph pattern is included in the graph to be searched (S520), and if it is determined that the preset graph pattern is included in the graph to be searched, the control unit 20 determines that the pattern distribution corresponding to the preset graph pattern stored in the storage unit 10 is the pattern distribution of the graph pattern to be searched (S530).

If it is determined that the preset graph pattern is not included in the graph to be searched, the control unit 20 searches for the node shared by the two different preset graph patterns stored in the storage unit 10 to perform the graph search (S540), and the control unit 20 calculates the pattern distribution of the graph pattern to be searched including the two preset pattern which share one node by multiplying the values of the pattern distributions corresponding to the two preset patterns (S550).

While the present invention is described in detail with reference to the preferred embodiment, but the present invention is not limited thereto and may be variously modified within a scope of claims.

DESCRIPTION OF REFERENCE NUMERALS

10: Storage unit
20: Control unit
100: Data processing apparatus
GP: Graph pattern

What is claimed is:

1. A data processing apparatus, comprising:
a storage unit adapted to store a preset graph pattern, an occurrence frequency of the preset graph pattern, and information on actual data nodes corresponding to each node which belongs to the graph pattern; and
a control unit adapted to compare the preset graph pattern with a graph pattern to be searched to perform a graph search, and when the preset graph pattern is not included in the graph to be searched, search for a node shared by two different preset graph patterns which are stored in the storage unit to perform the graph search and when the preset graph pattern is included in the graph to be searched, determine that a pattern distribution corresponding to the preset graph pattern stored in the storage unit is a pattern distribution of the graph pattern to be searched.

2. The data processing apparatus of claim 1, wherein the graph pattern has a size of a preset value or less.

3. The data processing apparatus of claim 1, wherein information on the actual data node or a node shared by the graph pattern is stored by a list or a hash structure.

4. The data processing apparatus of claim 1, wherein the occurrence frequency of the graph pattern to be searched is calculated by multiplying the occurrence frequencies of each of the two preset graph patterns.

5. A method for predicting a pattern frequency of a data processing apparatus, comprising:

storing, by a control unit, a preset graph pattern, an occurrence frequency of the preset graph pattern, and information on actual data nodes corresponding to each node which belongs to the graph pattern;

searching, by the control unit, when the preset graph pattern is not included in a graph to be searched, a node shared by two different preset graph patterns which are stored in a storage unit;

calculating, by the control unit, a pattern distribution of a graph pattern to be searched including two preset patterns which share one node by multiplying values of pattern distributions corresponding to the two preset patterns; and when the preset graph pattern is included in the graph to be searched, determining, by the control unit, that a pattern distribution corresponding to the preset graph pattern stored in the storage unit is the pattern distribution of the graph pattern to be searched.

\* \* \* \* \*